(12) United States Patent
Bates et al.

(10) Patent No.: US 12,039,776 B2
(45) Date of Patent: *Jul. 16, 2024

(54) SYSTEMS AND METHODS FOR PRESENTING SUPPLEMENTAL CONTENT IN AUGMENTED REALITY

(71) Applicant: Rovi Guides, Inc., San Jose, CA (US)

(72) Inventors: Adam Bates, Los Gatos, CA (US); Jesse F. Patterson, Pacifica, CA (US); Mark K. Berner, Santa Clara, CA (US); Eric Dorsey, Palo Alto, CA (US); Jonathan A. Logan, Mountain View, CA (US); David W. Chamberlin, Pacifica, CA (US); Paul Stevens, Felton, CA (US); Herbert A Waterman, Merced, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,496

(22) Filed: Jul. 26, 2022

(65) Prior Publication Data
US 2023/0005263 A1 Jan. 5, 2023

Related U.S. Application Data

(63) Continuation of application No. 17/171,479, filed on Feb. 9, 2021, now Pat. No. 11,443,511, which is a
(Continued)

(51) Int. Cl.
*G06V 20/00* (2022.01)
*G06F 16/583* (2019.01)
(Continued)

(52) U.S. Cl.
CPC ............ *G06V 20/20* (2022.01); *G06F 16/583* (2019.01); *G06F 16/5854* (2019.01);
(Continued)

(58) Field of Classification Search
None
See application file for complete search history.

(56) References Cited

U.S. PATENT DOCUMENTS

| 6,239,794 B1 | 5/2001 | Yuen et al. |
| 6,336,082 B1 | 1/2002 | Nguyen et al. |

(Continued)

FOREIGN PATENT DOCUMENTS

| JP | 2014035642 A | 2/2014 |
| JP | 2016521881 A | 7/2016 |

(Continued)

OTHER PUBLICATIONS

Higuchi et al., "TweetGlue: Leveraging a crowd tracking infrastructure for mobile social augmented reality," 2015 International Wireless Communications and Mobile Computing Conference, Aug. 24, 2015 (6 Pages).

(Continued)

*Primary Examiner* — Martin Mushambo
(74) *Attorney, Agent, or Firm* — Haley Guiliano LLP

(57) ABSTRACT

Systems and methods provided for presenting supplemental content in an augmented reality environment where an object within a field of view of an augmented reality device of a user is identified and processed to detect a reference related to a participant in an event. A user profile or user social network is searched to identify a message from the user about the participant. The message may be combined with the object in the augmented reality field of view.

20 Claims, 13 Drawing Sheets

1400

1410 — Store a Picture that Represents a View Through the Augmented Reality Device of the Content of the Given Message Combined with the Reference Detected on the Object 1420 — Generate for Display an Option for the User to Transmit the Picture to the Social Network.

Related U.S. Application Data continuation of application No. 16/459,867, filed on Jul. 2, 2019, now Pat. No. 10,943,121, which is a continuation of application No. 15/856,432, filed on Dec. 28, 2017, now Pat. No. 10,360,454.

(51) Int. Cl.
  *G06F 16/9535* (2019.01)
  *G06Q 50/00* (2012.01)
  *G06T 11/00* (2006.01)
  *G06T 11/60* (2006.01)
  *G06V 20/20* (2022.01)
  *H04L 51/52* (2022.01)

(52) U.S. Cl.
  CPC ......... *G06F 16/9535* (2019.01); *G06Q 50/01* (2013.01); *G06T 11/00* (2013.01); *G06T 11/60* (2013.01); *H04L 51/52* (2022.05); *G06T 2200/24* (2013.01)

(56) References Cited

U.S. PATENT DOCUMENTS

| | | | |
|---|---|---|---|
| 6,564,378 | B1 | 5/2003 | Satterfield et al. |
| 7,165,098 | B1 | 1/2007 | Boyer et al. |
| 7,620,238 | B1 | 11/2009 | Zirker |
| 7,761,892 | B2 | 7/2010 | Ellis et al. |
| 8,046,801 | B2 | 10/2011 | Ellis et al. |
| 9,031,329 | B1 | 5/2015 | Farid et al. |
| 9,159,169 | B2 | 10/2015 | Kuroki et al. |
| 9,164,577 | B2 | 10/2015 | Tapley et al. |
| 9,495,399 | B1 | 11/2016 | Dow et al. |
| 9,530,250 | B2 | 12/2016 | Mazula |
| 9,558,593 | B2 | 1/2017 | Tomita |
| 9,668,023 | B1 * | 5/2017 | Twyman ............... G06V 40/172 |
| 10,360,454 | B1 | 7/2019 | Bates et al. |
| 10,573,019 | B1 | 2/2020 | Anadure et al. |
| 10,943,121 | B2 | 3/2021 | Bates et al. |
| 11,443,511 | B2 | 9/2022 | Bates et al. |
| 2002/0174430 | A1 | 11/2002 | Ellis et al. |
| 2005/0251827 | A1 | 11/2005 | Ellis et al. |
| 2008/0303814 | A1 | 12/2008 | Ishiyama |
| 2010/0091139 | A1 | 4/2010 | Sako et al. |
| 2010/0153885 | A1 | 6/2010 | Yates |
| 2012/0062595 | A1 | 3/2012 | Oh et al. |
| 2012/0134593 | A1 | 5/2012 | Becker |
| 2012/0192235 | A1 | 7/2012 | Tapley et al. |
| 2013/0051615 | A1 | 2/2013 | Lim et al. |
| 2013/0097554 | A1 | 4/2013 | Wyeld |
| 2013/0317912 | A1 * | 11/2013 | Bittner ................ G06Q 50/01 345/633 |
| 2014/0002493 | A1 | 1/2014 | Mitchell et al. |
| 2016/0070439 | A1 | 3/2016 | Bostick et al. |
| 2016/0086381 | A1 | 3/2016 | Jung et al. |
| 2016/0191887 | A1 | 6/2016 | Casas |
| 2017/0132842 | A1 | 5/2017 | Morrison |
| 2017/0200310 | A1 | 7/2017 | Kapinos et al. |
| 2019/0205645 | A1 | 7/2019 | Bates et al. |
| 2020/0125847 | A1 | 4/2020 | Bates et al. |
| 2021/0166031 | A1 | 6/2021 | Bates et al. |

FOREIGN PATENT DOCUMENTS

| | | |
|---|---|---|
| JP | 2017182628 A | 10/2017 |
| KR | 20130022491 A | 3/2013 |
| KR | 20150130555 A | 11/2015 |
| WO | 2013049248 A2 | 4/2013 |
| WO | 2014144526 A2 | 9/2014 |
| WO | 2015122633 A1 | 8/2015 |

OTHER PUBLICATIONS

PCT International Search Reported for International Application No. PCT/US2018/040339, dated Oct. 4, 2018 (15 pages).

* cited by examiner

JaneJ

11/21/2017

Can't wait for turkey coma and football!

11/19/2017

What a sunrise!

11/05/2017

I can't believe I ate all the candy… ☹

10/31/2017

How old is too old to trick or treat?

10/15/2017

All nighter tonight

. . .

02/07/2017

Who's watching the super bowl?

Store a Picture that Represents a View Through the Augmented Reality Device of the Content of the Given Message Combined with the Reference Detected on the Object

1420

Generate for Display an Option for the User to Transmit the Picture to the Social Network.

FIG. 14

SYSTEMS AND METHODS FOR PRESENTING SUPPLEMENTAL CONTENT IN AUGMENTED REALITY

CROSS-REFERENCE TO RELATED APPLICATIONS

This application is a continuation of U.S. patent application Ser. No. 17/171,479, filed Feb. 9, 2021, which is a continuation of U.S. patent application Ser. No. 16/459,867 (now U.S. Pat. No. 10,943,121), filed Jul. 2, 2019, which is a continuation of U.S. patent application Ser. No. 15/856,432 (now U.S. Pat. No. 10,360,454), filed Dec. 28, 2017, the disclosures of which are hereby incorporated by reference herein in their entireties.

BACKGROUND

A user can use an augmented reality device to provide an enhanced or modified version of the user's environment by adding features or information in the user's field of view. Existing augmented reality applications include, for example, games that overlay a user's environment, or information services that can obtain information for objects in a field of view. It would be helpful if such information could be tailored to be relevant to the user.

SUMMARY

Accordingly, systems and methods are described for presenting supplemental content in augmented reality. Augmented reality is a modified version of reality that can include enhanced information overlaid over views of the real world. In general, augmented reality environments can be accessed using dedicated devices such as smart glasses or a headset. Augmented reality environments can also be accessed using an application on a multi-use portable device, such as a smartphone or tablet. The augmented reality environment may use a camera to obtain a picture of a real-world view and use a computer or a processor to analyze the picture and detect objects in the picture which may be identified as having some relevance to the viewer or user and providing information about or interactive options relating to the object or objects.

In an example, an augmented reality user may use an augmented reality device such as smart glasses, a headset, mobile phone, or a smartphone to view a scene. The augmented reality device (e.g., the smart glasses or smartphone) may capture a picture or video image of the scene and search for objects in the image. In some scenarios, a user may specifically focus on a particular object in the scene by, for example, pointing the augmented reality device in a direction of the object. A media guidance application may analyze one or more objects in the image to determine whether any of the objects have a connection to the user. For any object determined to have a connection to the user, the media guidance application may identify supplemental content that is related to the object for the user. In some scenarios, to identify a connection between a user and an object, the media guidance application may search a user profile, user history, a user's social media, or another source of information about the user. The supplemental content that is identified by the media guidance application may be, for example, a message related to the object that may be obtained from a social network or social media, media content related to the object, such as a video clip, television program, movie, image, book, or other media content.

In an example, a method for presenting supplemental content in augmented reality may be provided by identifying an object within a field of view of an augmented reality device of a user. The field of view may be any environment the user wishes to use. For example, the field of view may be a location where the user is present. For example, the field of view may be a room in which the user is present, or a street scene where a user is walking, or a place the user is seeking, but may not be present in. The field of view could also be an image, such as a billboard, picture, magazine advertisement, etc. The augmented reality device may capture an image of such field of view. The image may be a video or still picture that captures the field of view. A media guidance application may process the image to detect an object in the image. The media guidance application may detect on the object a reference that may be related to a participant in an event. For example, the media guidance application may detect that there is a sports team logo in an image, such as on a billboard, vehicle, apparel, or another location in the image, that may be connected to a member of the sports team and the sports team may have a game or another upcoming event scheduled.

The media guidance application may search a profile of the user to find a connection between the user and the participant. For example, the media guidance application may search a social network for a message by the user that relates to the participant. In an example, a user may have posted on Twitter about a participant of a sports team or about the team or about the sport. If the media guidance application can identify a social media message by the user relating to the participant or team, the media guidance application may overlay, using the augmented reality device, a message about the participant. For example, the media guidance application could overlay a user's social media post about a sports player over an object related to the player in the image as seen in the augmented reality environment.

The message overlay in the augmented reality environment could be the content of the social media message by the user relating to the participant so that the message can be combined in the augmented reality image with the reference detected on the object. In some scenarios, the message may be the same as was used in the social media post. In other scenarios, the message may be shortened or abbreviated or otherwise based on the social media post message. In some examples, the location of the overlaid message may be on or near the object location in the field of view of the augmented reality device.

In another example, a method for presenting supplemental content in augmented reality is provided in which an augmented reality device of a user may be positioned over an object within a field of view of the augmented reality device. For example, a user may look at a particular field of view with smart glasses to position the view over an object. In another example, the user may place a portable device having augmented reality functionality over an object within a field of view. For example, the user may point a smartphone camera generally in a direction of an object. The user could also zoom in on the object using the smartphone camera.

A media guidance application may identify the object in the field of view of the augmented reality device of the user. For example, the media guidance application may detect some object that is the focus of a camera of the smartphone. In some examples, the object may be in the middle of the screen. In another example, the object may be an object that is stored in a user profile as being associated in some way with the user.

The media guidance application may capture an image of the object. The image may be captured in the augmented reality device by, for example, taking a photograph or screenshot. The image may also be captured using camera circuitry and store pixels representing the object. The media guidance application may then search a database to identify content that matches at least a portion of the image of the object. For example, the media guidance application may use image search tools to search one or more image databases to find a match of a portion of the object image.

Searching a database to identify suitable content may also include searching a database that includes entries that associate images with content. Such a database may be predefined to include entries that are related to a user and which include interesting supplemental content that may arise from time to time. Setting up such a database can improve search results and reduce the time to identify suitable supplemental content for a user. Such a database could be searched in addition to searching a general media database which may have more content items, but which are not defined with associated images. The database may have stored a plurality of entries that associate images with content. The images may be analyzed by control circuitry of a media guidance application to detect distinct items in the captured image of the object. The distinct items may be, for example, logos, faces, brand names, or other objects and items. The distinct items may be matched with associated content, and an entry associating the distinct items and the content may be stored in the database. The entries may be searched for the items or objects and a matching entry may be identified that substantially corresponds to one of the distinct items. When the media guidance application makes such a match, content in the entry that is associated with the distinct item, which is part of the captured image of the object and thus is also related to the object image, may be retrieved by the media guidance application and supplied to the augmented reality environment for the user.

If content matching the object image, or a portion of the image, is found in a media database, the media guidance application may retrieve metadata for the matching content. The metadata may be analyzed and used to detect information or a reference related to a participant in an event. For example, the media guidance application may find a matching sports team logo image and the associated metadata may include a sports team player name or names. The media guidance application may then search a list of messages previously transmitted by the user to a social network to identify a message that includes content matching the participant. For example, the media guidance application may search a user's social media posts for messages related to a player on a sports team having a matching logo.

The media guidance application may analyze the field of view in the augmented reality device to find placement or location of the objects and references. In particular, the media guidance application may identify a location on the object of the reference related to the participant. In the sports team logo example, the media guidance application may identify the region of the object in the field view having the logo. The media guidance application may determine which region of the object in the field of view includes the portion of the image that matches the matching content. In another example, a media guidance application may identify a player's name on a jersey or billboard and determine the region of the object in the field of view including the name.

The identified location may then be used by the media guidance application to position a message in the augmented reality device. For example, the media guidance application may cause the augmented reality device to overlay a message in the field of view for the user in the object location. The content of the message may be combined with the reference that was detected on the object. In an example, a user may have previously posted to a social network about a player on a sports team, and such social media message may be superimposed in the augmented reality field of view over the reference object.

In an illustrative example, the image in the field of view may be sports related. An example of content, objects or items in the view may be a sports logo. A search for related supplemental content may include detecting the sports logo and determining the name of the sports team associated with the sports logo, e.g., by way of searching for an entry in a database for an associated team name and logo, or by using metadata for the logo.

In another example, an event may be a sporting event. If the media guidance application determines that the event is a sporting event, the media guidance application may identify competitors participating in the sporting event. The competitors may be identified by searching a media database for information or metadata about the event. The media guidance application may also determine a team that is featured in the sporting event in the same manner. The competitor information may be used to determine a second team that is participating in the sporting event. For example, the competitor information may include metadata for each player that includes team information. If a second team is identified, the media guidance application may select a message to include in the augmented reality view that is related to the first team, any of the competitors, or the second team.

In another example, an event may have an associated time. For example, a sporting event may be scheduled at a particular time or in a particular order following another event. The time for the event may be identified by the media guidance application. A message that is selected by the media guidance application to include in the augmented reality view may be one that was transmitted to the user's social network within a threshold of time that is relevant or suitable for the event time. For example, a message about a sports team that is a year old may not be relevant for a game scheduled in the near future. Instead, a more recent message about the sports team may be selected by the media guidance application.

After a message has been combined with a reference in an object in a field of view for an augmented reality device, the user may wish to capture an image of the view. The media guidance application may store a picture that represents the view through the augmented reality device of the given message combined with the reference detected on the object for the user. The picture may be presented to the user in a display generated by the media guidance application along with an option for the user to transmit the picture to a social network.

In another illustrative example, a user may view with an augmented reality device another person wearing clothing that has a connection to a sports team. For example, the second person's clothing may include a graphic logo or another representation of a sports team. If such an image were in the augmented reality field of view and thus captured by the media guidance application, a resulting combination message and object view generated by the media guidance application for the user could also be transmitted to the second person. For example, the media guidance application could cause the message combined with the image to be sent to the second user's computer or smartphone, or an augmented reality device.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative example of a user's social media history in accordance with some embodiments of the disclosure;

FIG. 14 is a flowchart of an illustrative process for generating a social media image for a user in accordance with some embodiments of the disclosure.

DETAILED DESCRIPTION

Accordingly, systems and methods are described herein for enhancing a user's augmented reality experience. In particular, systems and methods are presented herein for adding a message, such as a message from a user's social network, to an object in a field of view in an augmented reality device.

Augmented reality devices, such as an augmented reality headset or smart glasses, or a portable device with an augmented reality application, such as a mobile phone, smartphone or tablet, may be used to present an augmented reality view. The view may be presented with the augmented reality device or application so that the user can see a particular view with additional information about the view. For example, an augmented reality environment at a makeup counter may show a user with various types of applied makeup. In another example, augmented reality can be used at home to show how furniture may fit in a room. In another example, augmented reality devices can be used while grocery shopping to do price and nutritional comparisons. While these uses are very helpful to the user, the user may wish to also have information tailored for them to be added in the augmented reality.

One way this can be accomplished is by using a media guidance application to analyze a view in the augmented reality environment to detect an object in the view. The object can be analyzed to determine a reference in the object that may have an associated participant or event. A media guidance application may search a user's social network to identify content that relates to the object, participant or event. For example, the media guidance application may search for a post by the user on social media that names or depicts the object, participant or event. If such a message is identified by the media guidance application, the media guidance application may add that message, or some version of the message, to the augmented reality view of the object. For example, the media guidance application may generate an overlay of the message to be displayed over the image in the augmented reality environment, in particular over or near the related object. This can be helpful for a user because the message is one that was originally provided by the user in another context and is now being added to the user's augmented reality view.

Figure 1:
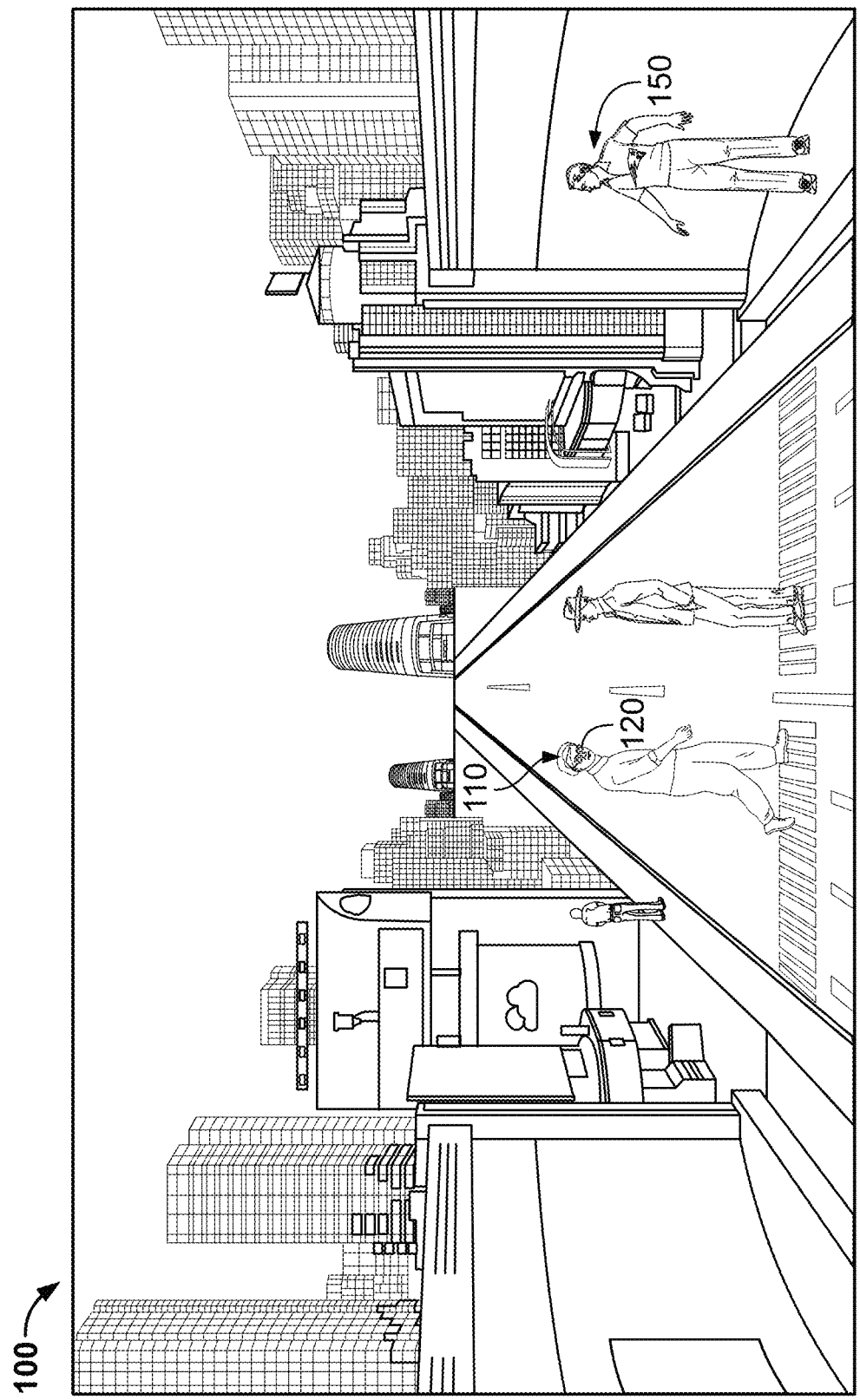
FIG. 1 shows an illustrative example of a user of an augmented reality device in accordance with some embodiments of the disclosure.

Turning to FIG. 1 which depicts a street scene 100 including a user 110 who is out for a walk on the street wearing an augmented reality headset 120 so that they can see their environment with additional information supplied by the augmented reality device. In an example, a user may walk around with an augmented reality device to see directions or map information while walking; the augmented reality device 120 may also capture images from the user's current environment. For example, the augmented reality device 120 may capture a person 150 on the sidewalk who is wearing a T-shirt with a New England Patriots logo.

Figure 2:
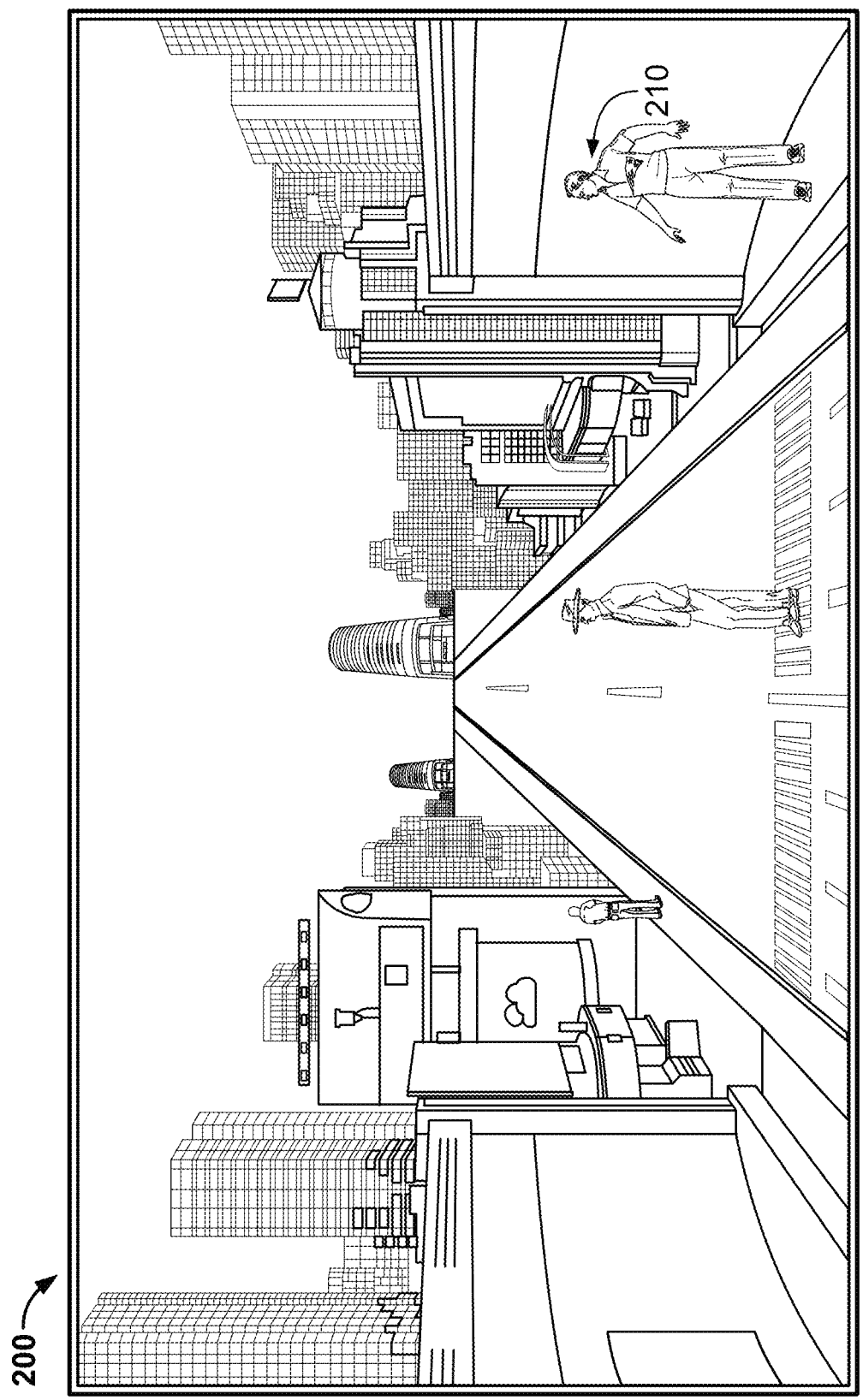
FIG. 2 shows an illustrative example of an augmented reality display in accordance with some embodiments of the disclosure.

An augmented reality device may also be a smartphone which may capture a street view such as that shown in FIG. 2 in view 200, which includes a person 210 wearing a T-shirt with a New England Patriots logo. Either of the augmented reality environments shown in FIGS. 1 and 2 may be suitable for a user to access the enhanced augmented reality features described herein. The views seen in the augmented reality environments may be captured, as, for example, images, by a media guidance application using camera circuitry in the augmented reality device. The user may focus on a particular aspect of the view, which may inform the media guidance application of an item of interest in the view. Alternatively, the media guidance application may parse the image to identify objects using object recognition techniques. The media guidance application may also call on outside databases and information, as well as user information, to provide helpful information to include in the augmented reality view.

Turning to FIG. 3, the media guidance application may, for example, search a user's social network to find information about the user that may be interesting to see in an augmented reality environment. As shown in FIG. 3, a user may have a record 300 of comments or posts on a social network that includes date information and messages, e.g., 302 and 310, and 305 and 315, respectively. As can be seen by the record 300, the user may have some interest in football. A media guidance application may parse such comments and determine that interest. In addition, the media guidance application may search a sports schedule or sports media database for metadata that may specify the sporting event referenced, for example, at messages 305 and 315.

Using the social network information about the user from the record 300, a media guidance application may find a message that is related to a reference or object in the view captured by the augmented reality device, e.g., the view 200 (FIG. 2). For example, the media guidance application may identify the person 210 (FIG. 2) and their T-shirt logo and detect that the logo is related to the New England Patriots and football. The media guidance application may parse the user's social media record 300 and detect messages about football. Such messages could be included in the augmented reality view. For example, message 305 may be added to the augmented reality view 200 (FIG. 2) as shown in FIG. 4.

Figure 4:
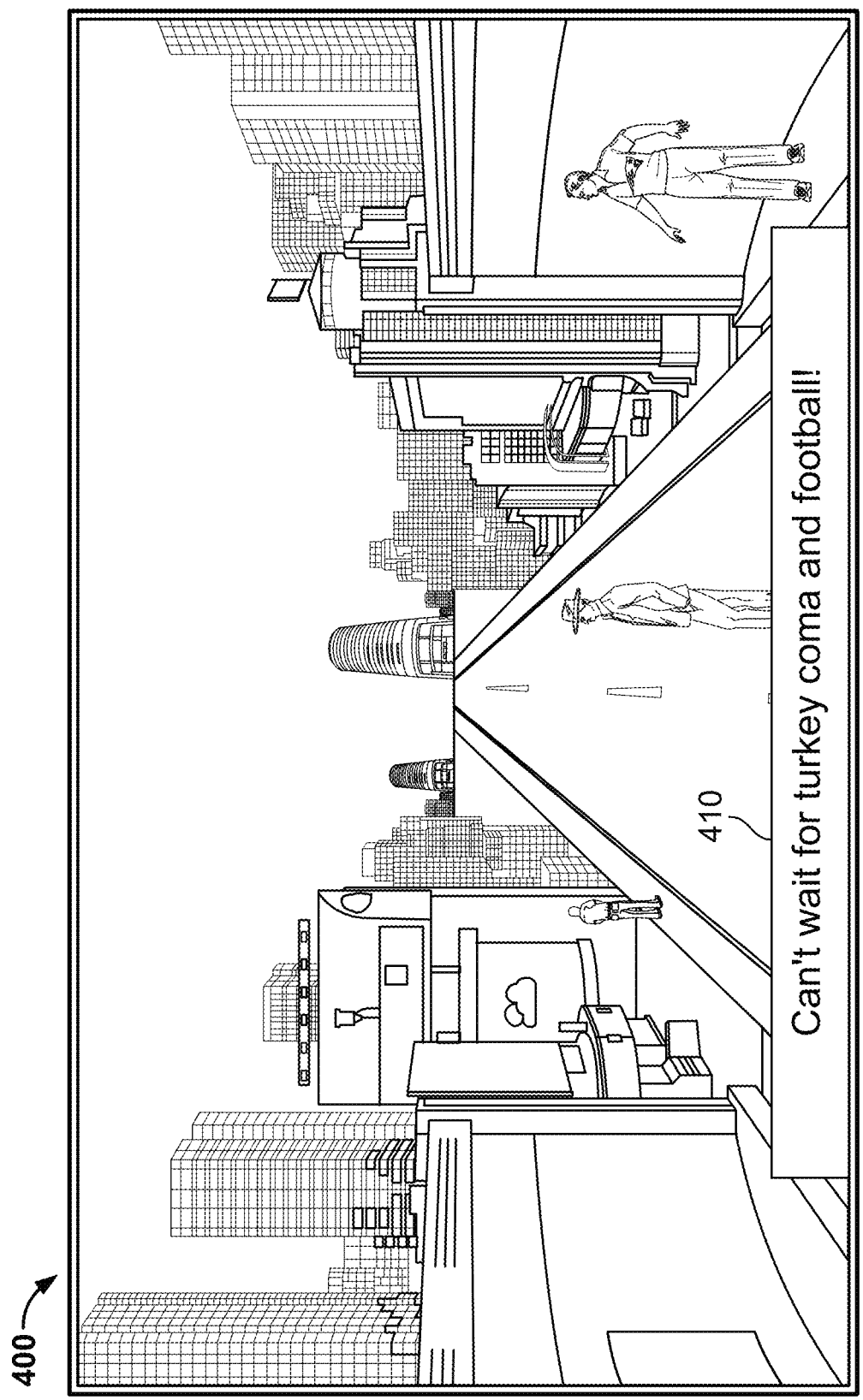
FIGS. 4-7 show illustrative examples of an augmented reality display in accordance with some embodiments of the disclosure.

FIG. 4 depicts an augmented reality view 400 that a user may see using an augmented reality device. In the view 400, a media guidance application has captured an object in the view 400: pedestrian 405 wearing a T-shirt with a New England Patriots logo. The media guidance application may search the user's social media network information to find suitable messages to include in the view. As shown in FIG. 4, a message 410 has been added to the view 400 that was taken from the user's social media record (e.g., message 305 (FIG. 3)). The message selected to be included in the augmented reality view 400 can be based on various factors, for example, time, relevance, user interest, or another basis. The message 410 selected for view 400 may be deemed relevant due, for example, to timeliness. Since the message 410 is the most recent in time message that the user has posted (see, e.g., record 300 (FIG. 3), the media guidance application may determine that it is suitable to include in the view 400.

Figure 5:
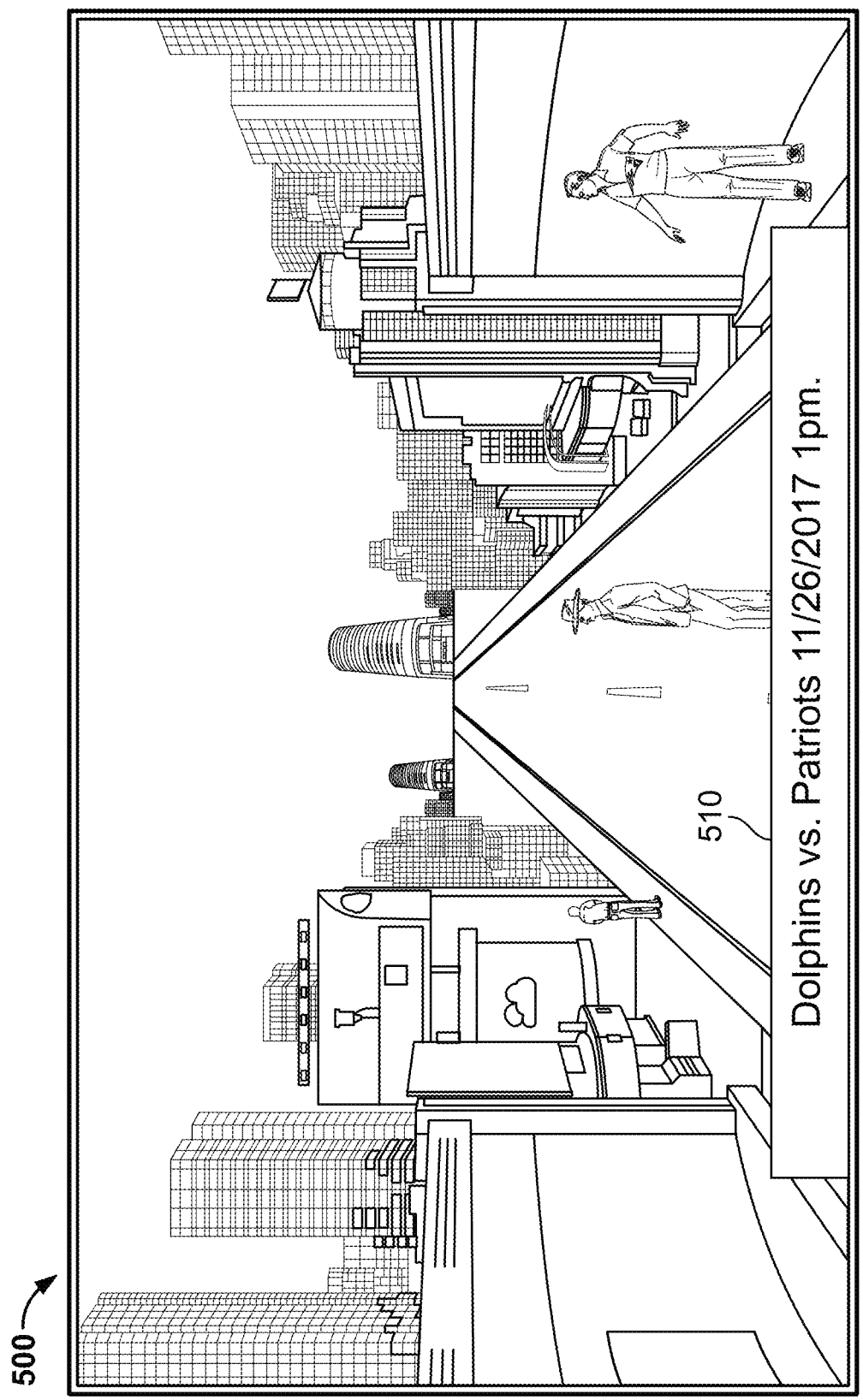

In another example, a message may be selected to be added to an augmented reality view by the media guidance application based on the social network record and additional information. As shown in FIG. 5, an augmented reality view 500 may include a person 505 wearing a T-shirt with a New England Patriots logo. The user may focus on the T-shirt, or the media guidance application may capture the logo as an interesting object in the image. The media guidance application may search for suitable content to include in the augmented reality view 500. In a search of the user's social network record (e.g., record 300 (FIG. 3), the media guidance application may detect an interest in football. Further, the media guidance application may select the most recent post, e.g., message 305 (FIG. 3), and determine whether there are any associated events for the object that are related to the message. For example, the media guidance application may search a media database or a sports database to identify a sporting event related to the sport or team that is around the time of the post. Thus, for the message 305 (FIG. 3), the media guidance application may search for football events around the date of the message. In addition, the media guidance application may search for football events for the team associated with the logo or reference object from the augmented reality view. A search of a sports database may show games for the New England Patriots after November 21, e.g., the Dolphins vs. Patriots game on Nov. 26, 2017 as shown in message 510.

Figure 6:
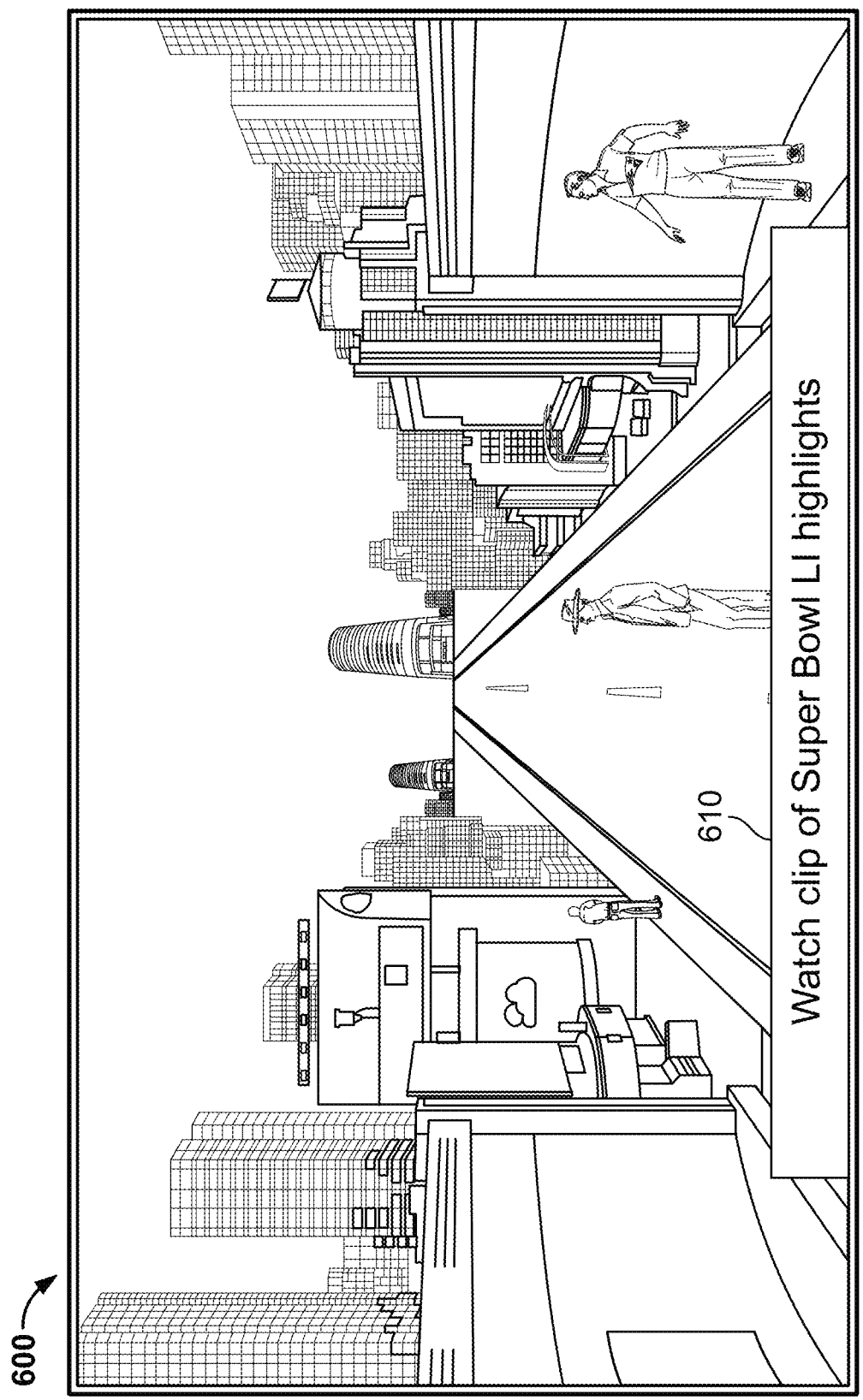

In another example, the media guidance application may obtain information about a reference object in an augmented reality view and select a message that provides a link to access content related to the reference object that may also be based on a user's history, e.g., a preference profile or social network. As shown in FIG. 6, an augmented reality view 600 may include a person 605 wearing a T-shirt with a logo for the New England Patriots football team. A media guidance application may detect the logo as a reference object in an image of the view 600 and search for a suitable message to overlay in the view 600 that is relevant to the object. The media guidance application may identify the logo, using image analysis tools, as being for the New England Patriots. The media guidance application may search a sports database for metadata about the team. The media guidance application may also search the user's history, e.g., social network record 300 (FIG. 3), for messages that may be relevant to the team or some metadata identified in the search of the sports database. The media guidance application may determine that the team—the New England Patriots—was a participant in the Super Bowl referenced in message 315 (FIG. 3). Thus, the media guidance application may select a clip related to the team playing in the Super Bowl to offer in a link that is overlaid in the view 600.

Figure 7:
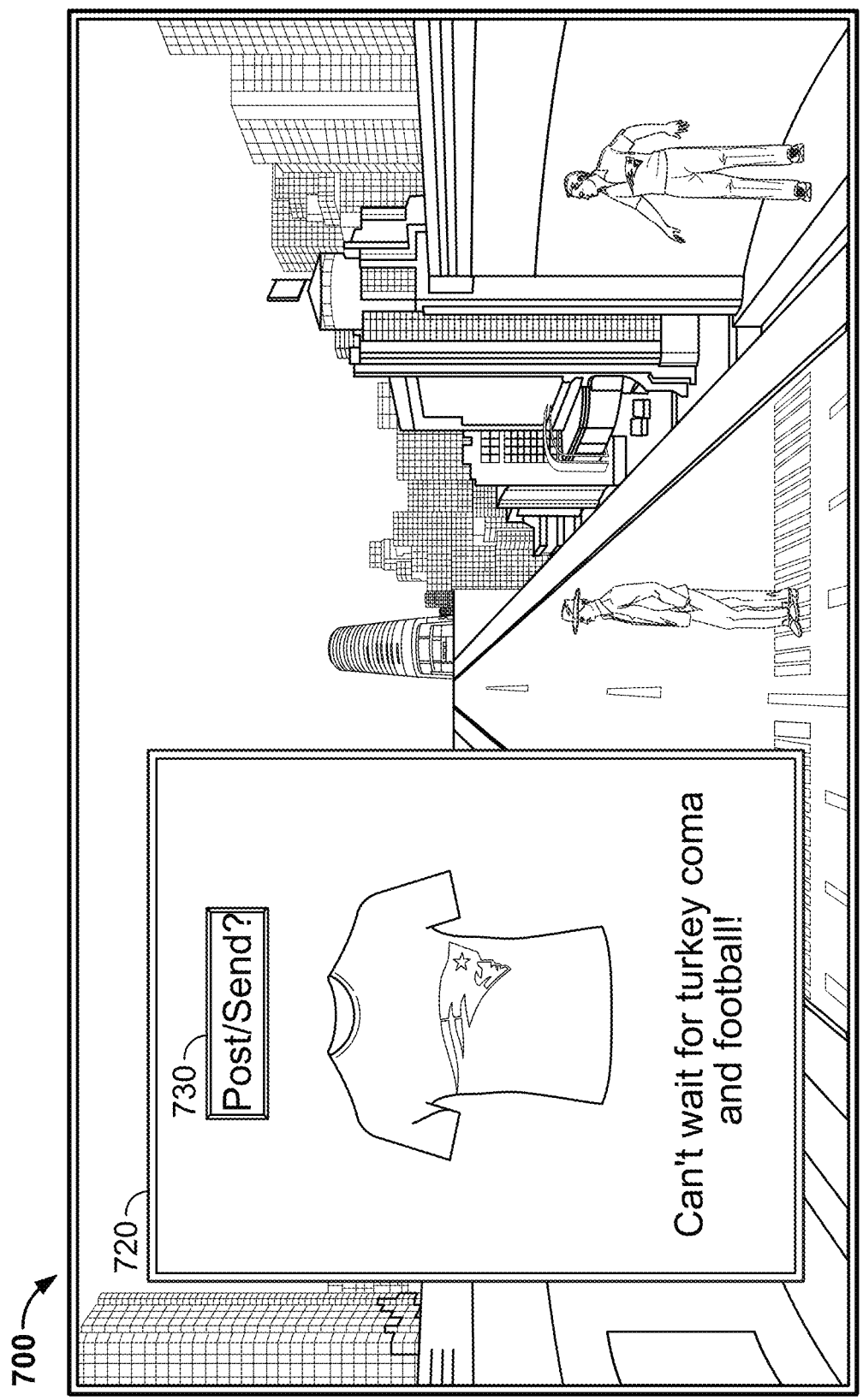

In another example, the media guidance application may select a reference object identified in an augmented reality view for sharing. The reference object may be shared on social media for the user, or shared with another person. For example, as shown in FIG. 7, an augmented reality view 700 may include a person 705 wearing a New England Patriots T-shirt and the media guidance application may detect the T-shirt as a reference object in the view. The detection of the T-shirt and its logo may be based on image analysis and recognition. The logo may be, for example, stored in a user preference profile based on a user's viewing history or social network history. The media guidance application may capture the reference object, e.g., the T-shirt and logo, and provide a message 720 in the augmented reality view 700 including the reference object and a comment. The comment "Can't wait for turkey coma and football," may be obtained by the media guidance application using, for example, the user's social network history. For example, the comment may be based on a recent post 305 (FIG. 3) that is deemed by the media guidance application to be timely as well as related to the sport associated with the logo. The message 720 may also include a selectable option 730 for the user to post the image to a social network, or send it to a recipient, or other manner of sharing the image. In some examples, the recipient may be identified in the message 720 and option 730 as the person 705 who may be identified by facial/image recognition techniques by the media guidance application, which may have access to a user's contacts and image history.

Although the examples described with reference to FIGS. 1-7 have involved only sporting events, other types of image objects could also be used in the same manner. For example, faces, brand names, flags, television shows, landmarks, or other objects may be identified using image recognition techniques, and searches of databases for metadata associated with the images may be performed to find events related to such items. For example, a billboard advertisement showing Lady Gaga could be recognized and a database search for her name could include information about her appearance in the 2017 Super Bowl halftime show, which could also be added in the augmented reality views and be related to a user's comment 315 (FIG. 3) about watching the Super Bowl. In another example, the billboard showing Lady Gaga could result in a message about her upcoming concert.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (e.g., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 8:
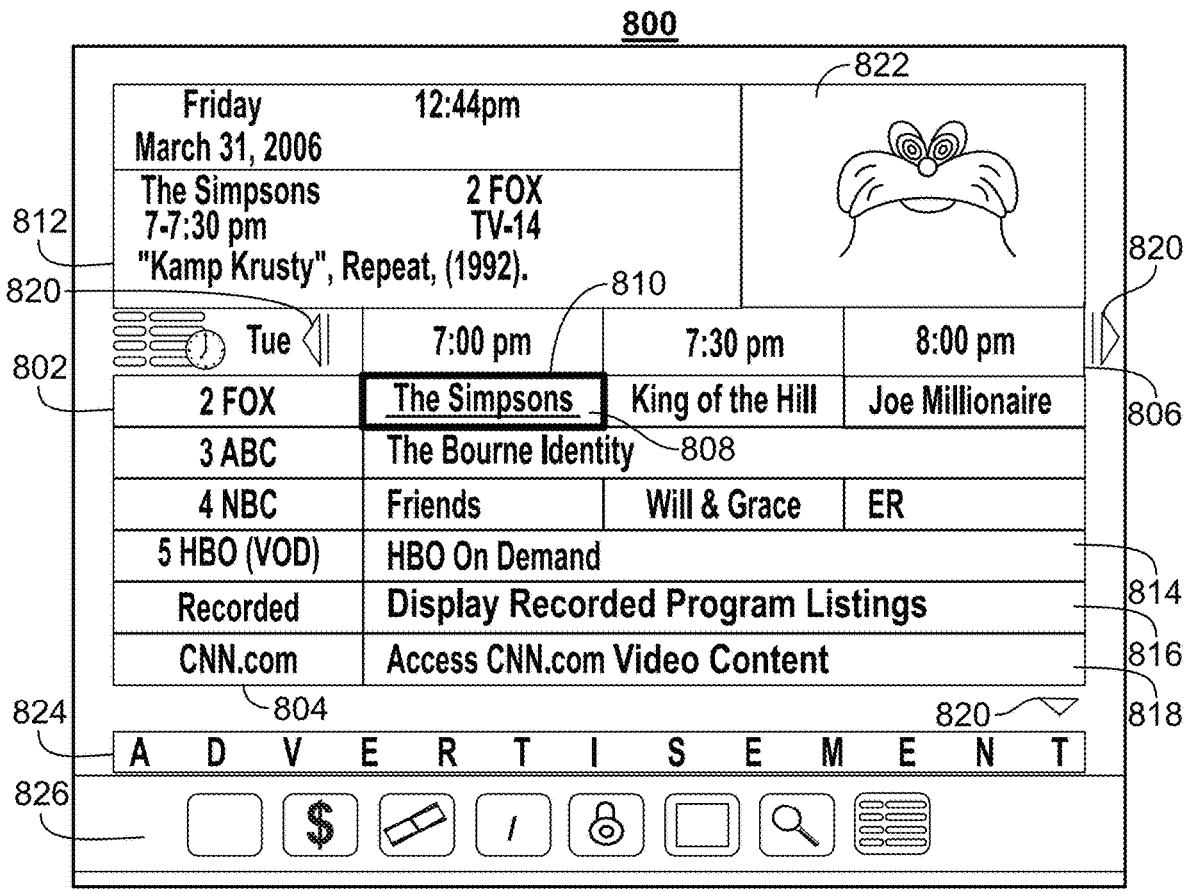
FIGS. 8-9 show other illustrative examples of display screens generated by a media guidance application in accordance with some embodiments of the disclosure.
Figure 9:
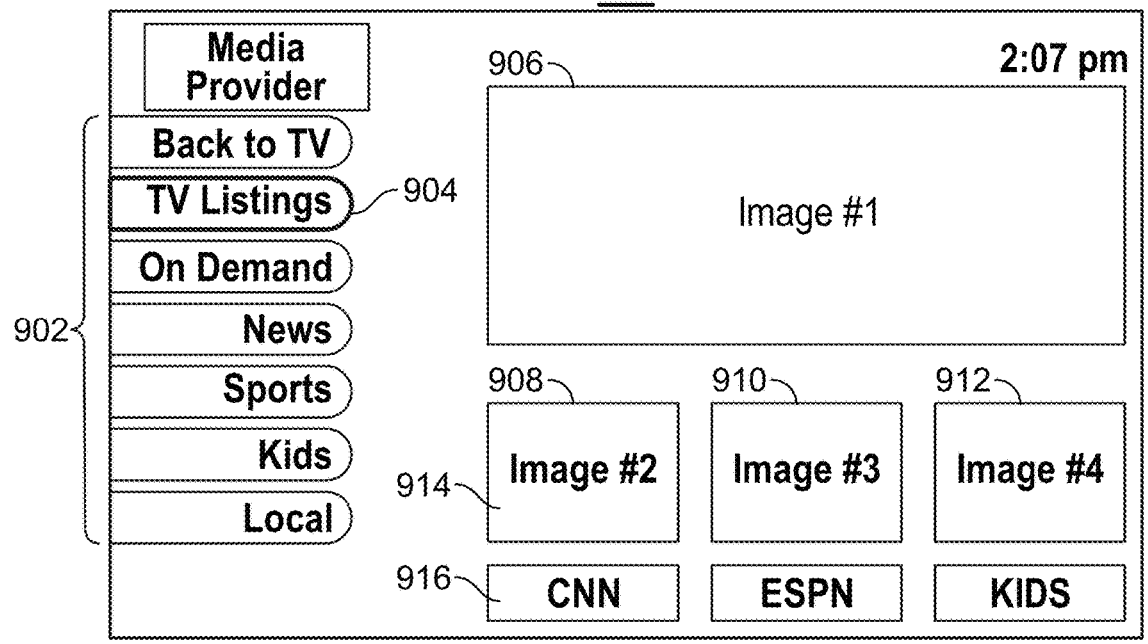

FIGS. 8-9 show illustrative display screens that may be used to provide media guidance data. The display screens shown in FIGS. 8-9 may be implemented on any suitable user equipment device or platform. While the displays of FIGS. 8-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listing's associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 826. Video region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 900, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (e.g., listing 906 is larger than listings 908, 910, and 912), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 10:
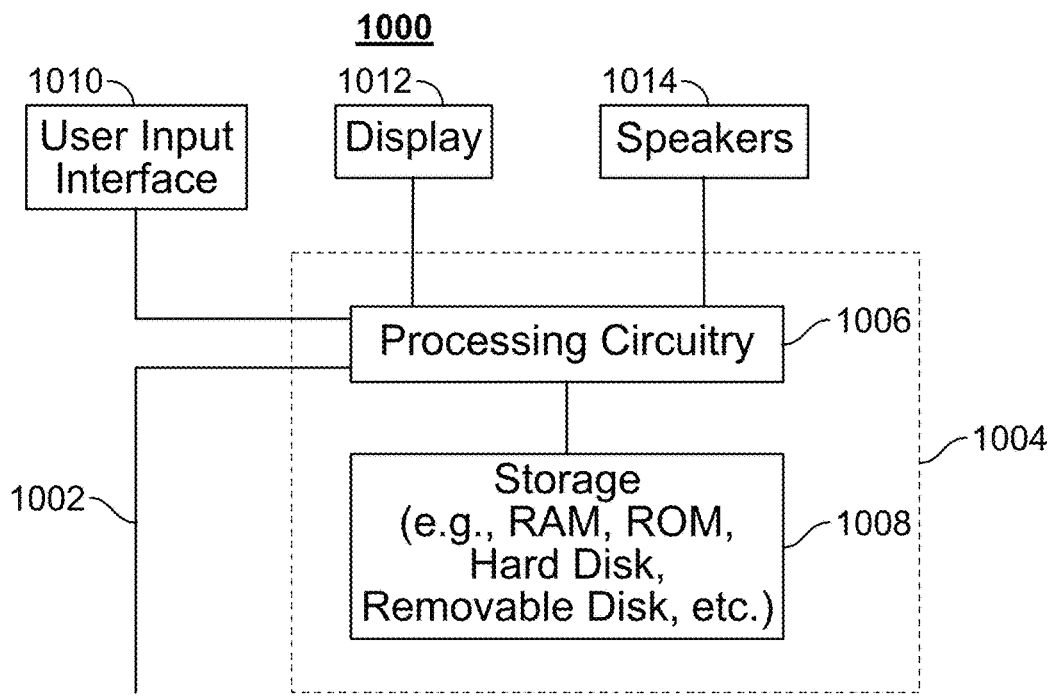
FIG. 10 is a block diagram of an illustrative user equipment device in accordance with some embodiments of the disclosure.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (e.g., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 11, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 11:
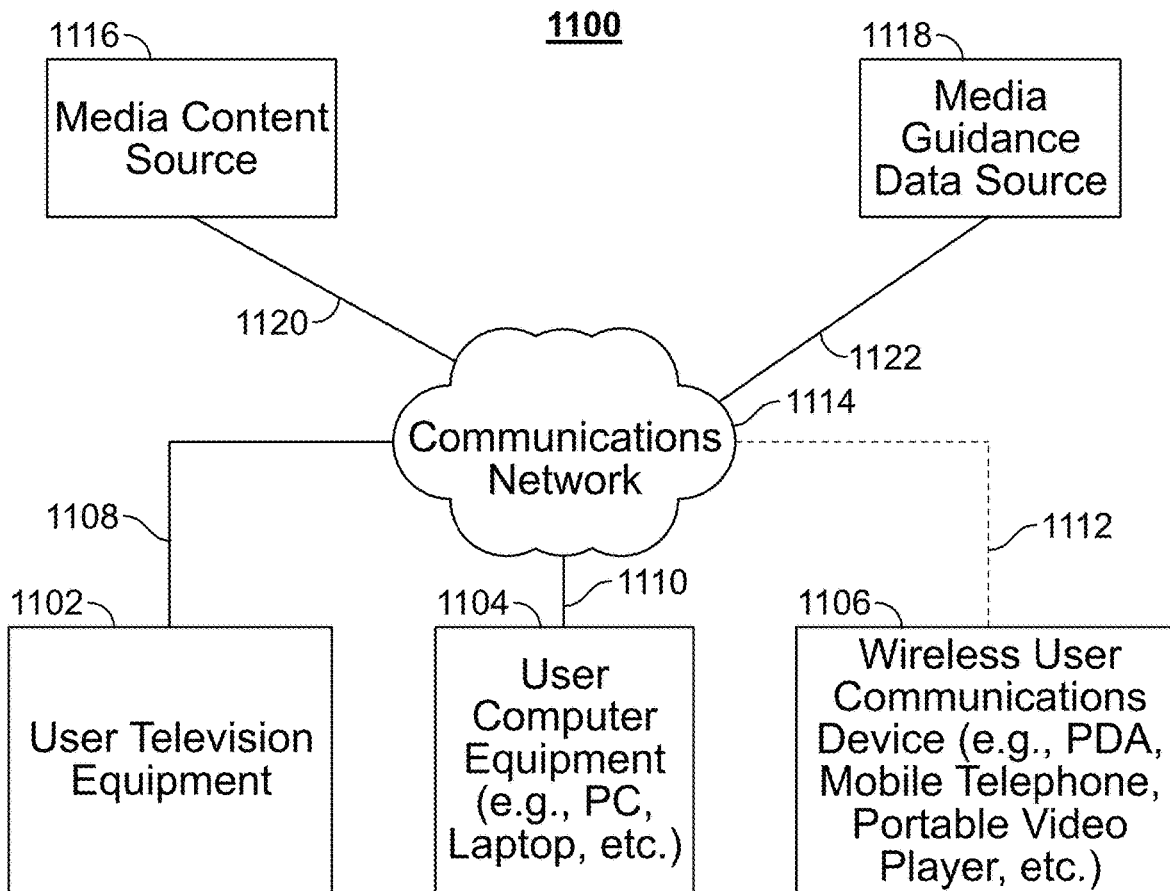
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1118 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, e.g., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 12:
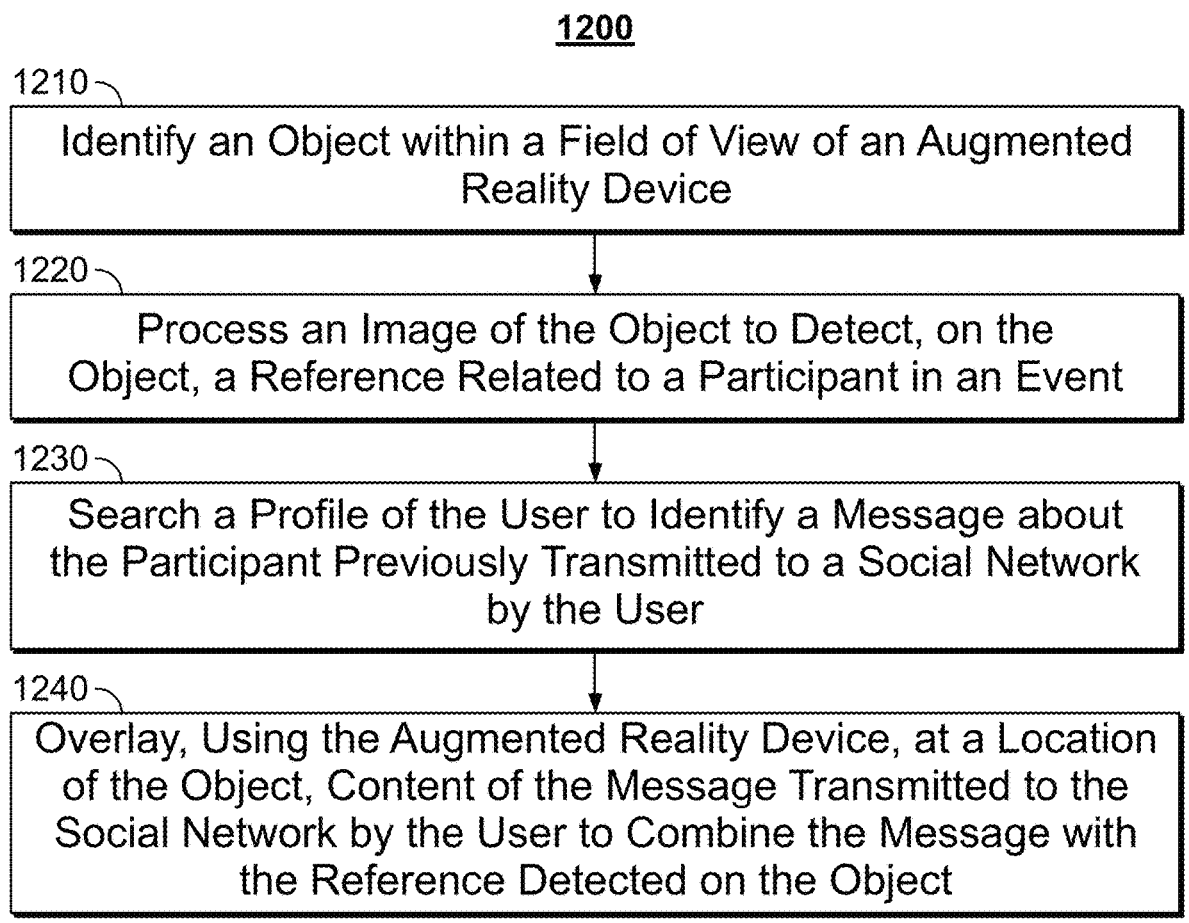
FIG. 12 is a flowchart of an illustrative process for adding a message to an object in an augmented reality view in accordance with some embodiments of the disclosure.

FIG. 12 is a flowchart of illustrative steps of a process 1200 for adding information to an augmented reality view in accordance with some embodiments of the disclosure. It should be noted that process 1200 or any step thereof could be performed on, or provided by, any of the devices shown in FIGS. 10-11. For example, process 1200 may be executed by control circuitry 1004 (FIG. 10) as instructed by a media guidance application implemented on a user device (e.g., user equipment devices 1102, 1104, and/or 1106 (FIG. 11)) to present added information in an augmented reality environment. In addition, one or more steps of process 1200 may be incorporated into or combined with one or more steps of any other process or embodiment described herein.

FIG. 12 depicts an illustrative process 1200 for providing information in an augmented reality view. At step 1210, control circuitry 1004 for a media guidance application may identify an object within a field of view of an augmented reality device. For example, a user using an augmented reality device may have a certain field of view (e.g., views 200, 400, 500, 600 or 700) including various objects. The media guidance application may capture an image in the view using camera circuitry. The media guidance application may also determine whether the user is focusing in the view on a particular object or direction.

At step 1220, control circuitry 1004 for a media guidance application may process an image of the object. The media guidance application may use camera circuitry to capture and process the image with control circuitry 1004 to detect, on the object, a reference related to a participant in an event. The media guidance application may use image analysis tools to analyze the image using control circuitry 1004 to identify the object. The media guidance application may then search a media or other database to obtain additional information about the object to determine the reference, participant and event associated with the object.

At step 1230, control circuitry 1004 for a media guidance application may search a profile of the user to find content that may be relevant to the object. In particular, control circuitry 1004 for a media guidance application may search the user profile to identify a message about the participant that was previously transmitted to a social network by the user. Thus, the media guidance application may use participant or event information associated with the object to find a message from the user's social network that is relevant to the object in the augmented reality view. For example, the media guidance application may search the user's social network record 300 (FIG. 3) to identify a message that is related to a participant in the object. Building on the examples provided earlier, the media guidance application may detect a sports team logo in an augmented reality device display and determine a participant—e.g., the team, or players on the team associated with the logo, the sport, or other stakeholder metadata for the logo. The media guidance application may then search the user's history to find related content, e.g., social network comments, media associated with the user history, etc.

At step 1240 the control circuitry 1004 for a media guidance application may overlay in a display on the augmented reality device a message identified in the user's history. For example, the media guidance application may use a comment from a user's social network history that is related to the object reference to overlay in the augmented reality view. The control circuitry 1004 for a media guidance application may cause the overlay to be generated at an approximate location of the object, or other suitable location so that the user can see the connection between the message and the object. The message overlay may be a combination of the content of a message from a user's social network history and the reference object. Thus, in an example, a social network message about football may be displayed in an augmented reality view as an overlay of the sports logo reference object in the augmented reality view.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 12.

Figure 13:
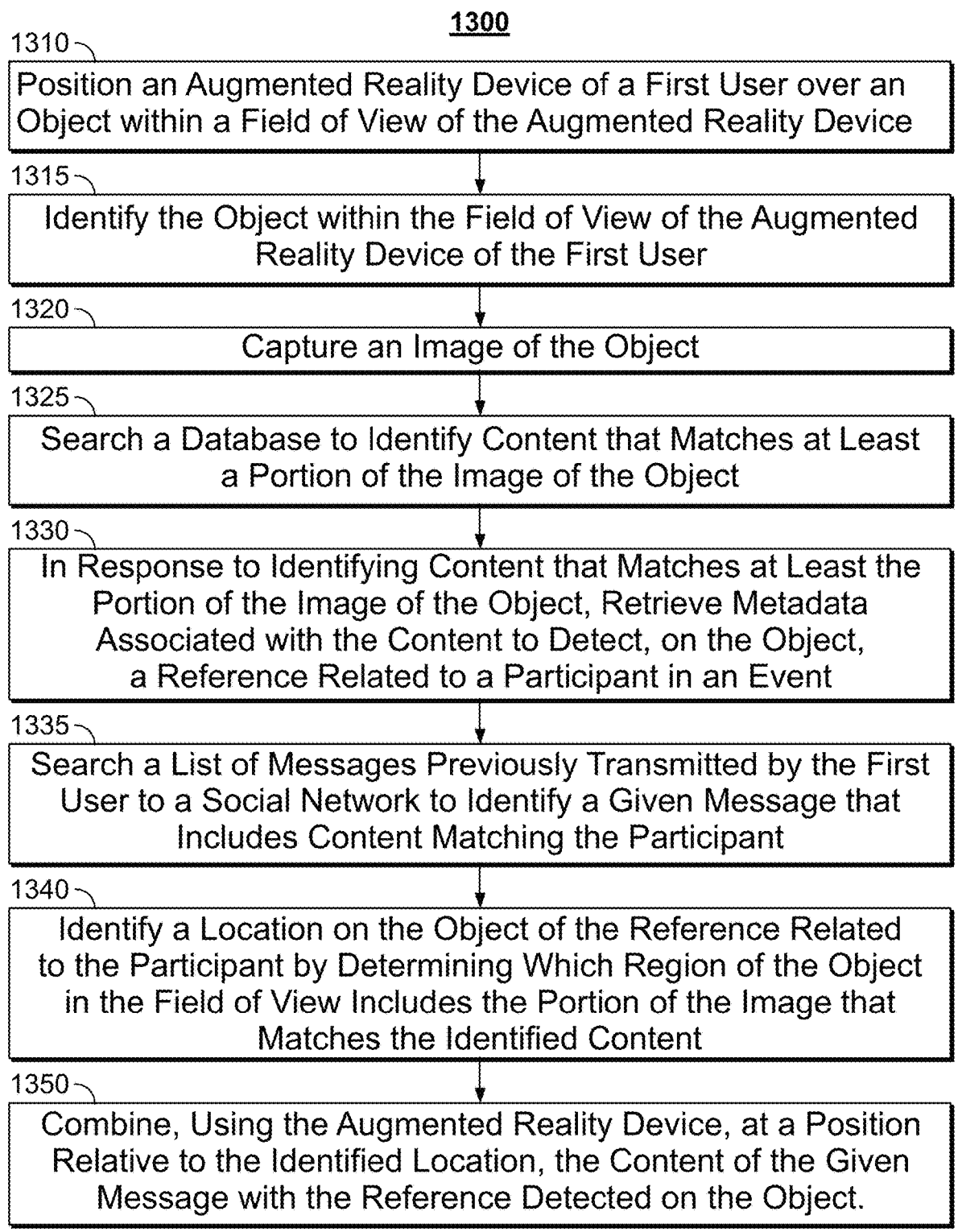
FIG. 13 is a flowchart of another illustrative process for adding a message to an object in an augmented reality view in accordance with some embodiments of the disclosure.

FIG. 13 is a flowchart of illustrative steps of a process 1300 for adding information to an augmented reality view in accordance with some embodiments of the disclosure. It should be noted that process 1300 or any step thereof could be performed on, or provided by, any of the devices shown in FIGS. 10-11. For example, process 1300 may be executed by control circuitry 1004 (FIG. 10) as instructed by a media guidance application implemented on a user device (e.g., user equipment devices 1102, 1104, and/or 1106 (FIG. 11)) to present added information in an augmented reality environment. In addition, one or more steps of process 1300 may be incorporated into or combined with one or more steps of any other process or embodiment described herein.

FIG. 13 is an illustrative flowchart depicting a process 1300 that may be followed to provide information in an augmented reality view that includes a message with a reference object in the view. At step 1310 control circuitry 1004 for a media guidance application may be used to position an augmented reality device of a first user over an object within a field of view of the augmented reality device. The media guidance application may focus a view of a display in an augmented reality device over an object in the view. For example, in the view 200 shown in FIG. 2, the media guidance application may focus on one or more objects in the view 200. For example, the media guidance application may focus on an advertisement in a billboard, a nearby store, or one of the persons in the view 200, such as the person 210. Focusing on the object in the view may be achieved by, for example, detecting a direction or orientation of the augmented reality device, a user history of object interest, a user's calendar to determine temporal foci, or another basis. In another example, the object focus may be based on a user's action within the augmented reality environment.

At step 1315, the control circuitry 1004 for the media guidance application may identify the object within the field of view of the augmented reality device of the first user. The object may be identified by the control circuitry 1004 by narrowing in the field of view focus from step 1310. The object may be identified using object recognition tools and techniques.

When the object has been identified, the control circuitry 1004 for the media guidance application, at step 1320, may capture an image of the object. The image may be captured by the control circuitry 1004 for the media guidance application using camera circuitry and using a photograph or video image capture that can include capturing the image using pixels or another image component.

At step 1325, the control circuitry 1004 for the media guidance application may search a database to identify content that matches at least a portion of the image of the object. The database search may be performed by the media guidance application using an image search tool or technique to determine content and context for the object image. The image search tool may provide metadata about the object image. Such metadata may be searched by the media guidance application in a database to find content matching the object image. For example, an image of person 210 (FIG. 2) may be captured at step 1320, and the image will be analyzed using an image search technique to detect, for example, that the image is of a person, that the person 210 may be recognized as being one that is known by the user based on facial or image recognition tools and a comparison of the user's contacts; in addition, the image search may detect that the person 210 is wearing shoes that are ones that have been purchased by the user, (based on a user's online shopping history), that the person 210 is wearing a T-shirt with a New England Patriots logo, (which may be known to the media guidance application as being for a team that is the user's favorite, or nemesis), or other details about the image.

At step 1330, in response to identifying content that matches at least the portion of the image of the object, the control circuitry 1004 for the media guidance application will retrieve metadata associated with the content to detect, on the object, a reference related to a participant in an event. Thus, at step 1330, the media guidance application will use information about identifying matching content for the image obtained at step 1325 to retrieve metadata about the matching content. For example, if the media guidance application detects that a person 210 (FIG. 2) is known to the user, e.g., using facial recognition tools, the media guidance application may retrieve metadata about the person or contact. In another example, if the media guidance application identifies that the object image is a New England Patriots logo, the media guidance application will retrieve metadata about the New England Patriots, for example, event and participant information. Such metadata and information could be obtained from a sports database or another suitable database. In another example, the media guidance application could identify that the object image includes apparel that is similar to something the user has previously purchased or liked on social media. In this example, the media guidance application may retrieve metadata relating to a store sale, spokespersons, pop-up shops, retail drops, or other event or participant related to the content.

At step 1335, the control circuitry 1004 for the media guidance application may search a list of messages previously transmitted by the first user to a social network to identify a given message that includes content matching the participant. In order to perform step 1335, the media guidance application may access a user's social network to search messages, such as comments, tags, links, or other content that is posted by the user, or that is posted by another contact and associated with or tagged for the user, e.g., as shown in record 300 (FIG. 3). The social media messages may be searched to find content that relates to the participant identified at step 1330. In an example, in response to detecting a New England Patriots logo on a T-shirt, the media guidance application may retrieve metadata for the New England Patriots team and search the user's social network for messages about the team. In this example, the media guidance application may detect message 310 (FIG. 3) as being related to the New England Patriots, who played in the Super Bowl in February 2017. In another example, the media guidance application may detect another message 302 (FIG. 3) as being related to the New England Patriots because the team will be playing a match soon after the message posting date.

At step 1340, the control circuitry 1004 for the media guidance application may identify a location on the object of the reference related to the participant by determining which region of the object in the field of view includes the portion of the image that matches the identified content. To perform step 1340, the media guidance application may compare the context of the augmented reality view with the object image information to determine the location of the object within the view.

The control circuitry 1004 for the media guidance application may then, at step 1350, combine, using the augmented reality device, at a position relative to the identified location, the content of the given message with the reference detected on the object. Thus, the social media message identified at step 1340 may be added to the view in the augmented reality device at a location near the object at step 1350 to provide a view such as those shown in FIGS. 4-6.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 13.

FIG. 14 is a flowchart of illustrative steps of a process 1400 for generating an option for a user to use an aspect depicted in an augmented reality view in accordance with some embodiments of the disclosure. It should be noted that process 1400 or any step thereof could be performed on, or provided by, any of the devices shown in FIGS. 10-11. For example, process 1400 may be executed by control circuitry 1004 (FIG. 10) as instructed by a media guidance application implemented on a user device (e.g., user equipment devices 1102, 1104, and/or 1106 (FIG. 11)) to present an option to share added information in an augmented reality environment. In addition, one or more steps of process 1400 may be incorporated into or combined with one or more steps of any other process or embodiment described herein.

FIG. 14 depicts a process 1400 that may be used to share an augmented reality view. In particular, it may be used to share a portion of an augmented reality view that includes information added to the view by a media guidance application. Process 1400 may follow process 1300. For example, process 1400 may follow step 1350 of process 1300 where a message and an object are combined and presented in an augmented reality environment. In another example, process 1400 may be used as a stand-alone process using a picture obtained by other techniques.

Process 1400 begins at step 1410 where control circuitry 1004 for the media guidance application may store a picture that represents a view through the augmented reality device of the content of the given message combined with the reference detected on the object. The picture may be captured by the media guidance application from a view in an augmented reality device that includes a message as well as a reference object using camera circuitry. The picture may be a view, such as those shown in FIGS. 4-6, that includes an augmented reality view along with a message that is based on content obtained from a user's social network. In some examples, the picture may be a portion of the view that includes the message and the object. In other examples, the picture may be the message combined with a portion of the reference object from the view. Other versions of the picture may include various combinations of the message and object. The picture may be stored by the media guidance application in a cache or database.

At step 1420, the control circuitry 1004 for the media guidance application may generate for display an option for the user to transmit the picture to the social network. To perform step 1420, the media guidance application may use the picture stored previously to generate a display in the augmented reality environment that includes an option to share the picture that was based on the enhanced view in the augmented reality environment. An example of such an option is depicted in FIG. 7, e.g., window 720, which shows the T-shirt with logo from the person 705 and includes an option 730 to post or send the image and message. Other types of interactions with the picture could also be provided in the option for the user's use.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 14.

Figure 15:
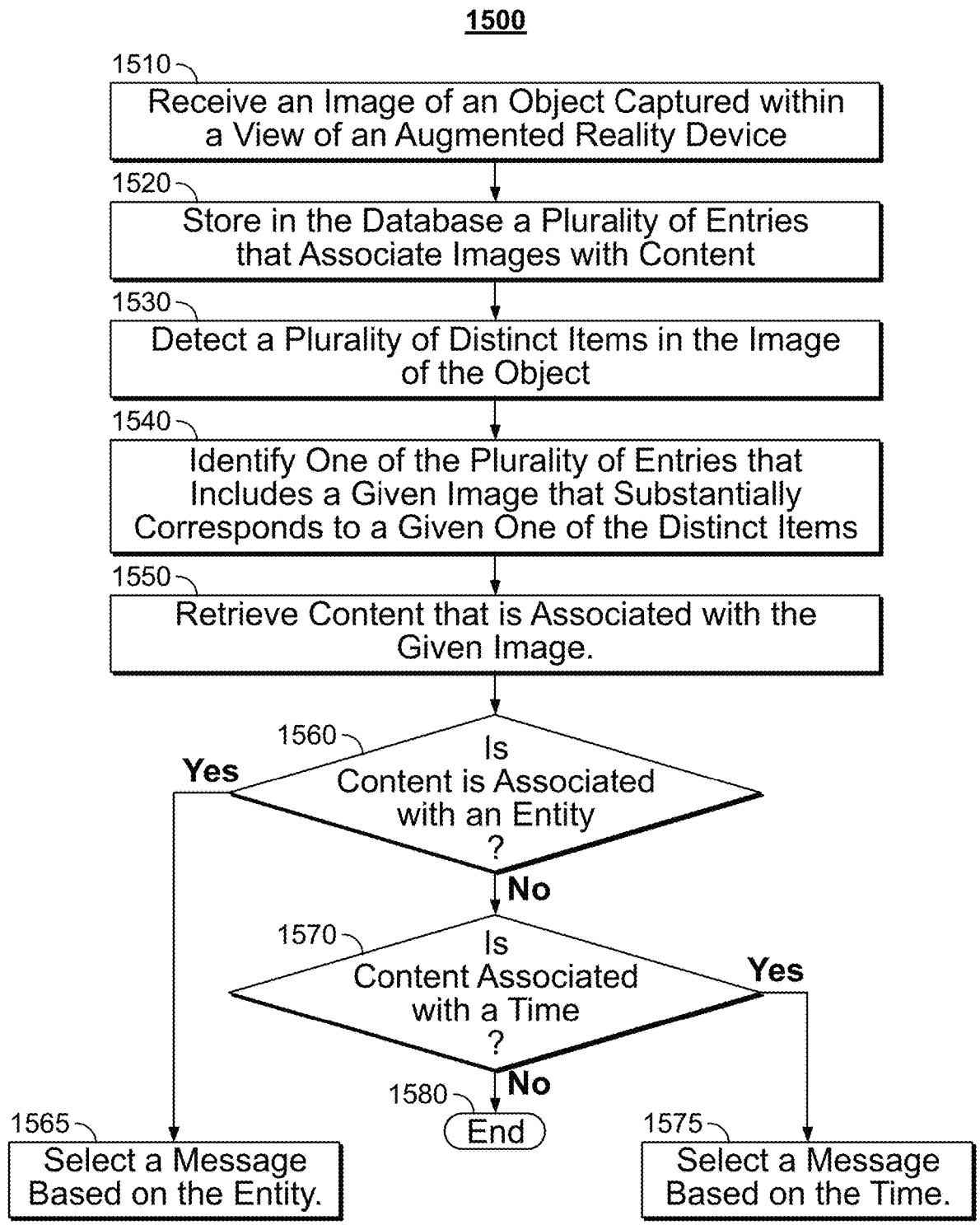
FIG. 15 is a flowchart of an illustrative process for selecting a message to add to an object in an augmented reality view in accordance with some embodiments of the disclosure.

FIG. 15 is a flowchart of illustrative steps of a process 1500 for selecting a message to combine with an object in an augmented reality view in accordance with some embodiments of the disclosure. It should be noted that process 1500 or any step thereof could be performed on, or provided by, any of the devices shown in FIGS. 10-11. For example, process 1500 may be executed by control circuitry 1004 (FIG. 10) as instructed by a media guidance application implemented on a user device (e.g., user equipment devices 1102, 1104, and/or 1106 (FIG. 11)) to select a message to add to an augmented reality environment. In addition, one or more steps of process 1500 may be incorporated into or combined with one or more steps of any other process or embodiment described herein.

FIG. 15 depicts a process 1500 for selecting a message to combine with an image in an augmented reality environment. Process 1500 may be used to select a message, for example, the message at step 1335 (FIG. 13), to add to an augmented reality view, or to select a message to add to a portion of an augmented reality view that has an object having some relation to a message in a user's social network. In an example, a media guidance application may search a user's social network history, user profile, Internet cache history, or other history to identify a message or comment that the user has left and match it to an object in the augmented reality view. Adding a social network message to a matched object in an augmented reality view may be interesting or relevant to a user because it is a comment or thought that the user has had in the past, and is one that the user has felt to be compelling enough to share with the user's social network. In order to expedite matching a message and images in an augmented reality environment, in some examples, a media guidance application may build a database for a particular user, or a set of users, of images and image objects that may be associated with metadata and links that can help facilitate searching for supplemental content to add to an augmented reality environment as well as messages from a user's social network that may be related to the images and image objects.

At step 1510, control circuitry 1004 for the media guidance application may receive an image of an object captured within a view of an augmented reality device. The image may be received from the augmented reality device using camera circuitry. In an example, the image may be a view such as the augmented reality views from FIG. 1-2 or 4-7.

At step 1520, control circuitry 1004 for the media guidance application may take the received image and store the image in a database in association with a plurality of entries that associate images with content. For example, images may be stored in a relational database that includes links and metadata for images. The image may be analyzed and deconstructed into components or elements, and links and metadata for each of the components or elements of the image may also be stored in the database. For example, a media guidance application may store an image taken from an augmented reality device and parse the image for objects that can be identified using image recognition or image processing tools to detect and then define the elements in the image.

At step 1530, control circuitry 1004 for the media guidance application may detect a plurality of distinct items in the image of the object. The distinct items may be detected using image processing tools that can narrow in on elements in the image and match them with images in an image database. In some examples, the image processing may include comparing pixels in the image to identify boundaries for objects that can be matched with objects in an image database.

At step 1540, the media guidance application may identify one of a plurality of entries that includes a given image that substantially corresponds to a given one of the distinct items. To perform step 1540, the media guidance application may search a media database, an image database or another database to find an entry for an image that is substantially the same as some element or component of the received image. The searching may be performed using image processing and recognition tools so that the image elements can be compared with images in the database. The database may have metadata and links for image items in the database. For example, an image database may have associated source information, description data, titles, keywords or other metadata associated with the image to facilitate retrieving the content.

At step 1550, the media guidance application may retrieve content that is associated with the given image that is matched from the database at step 1540. The content may be obtained by, for example, accessing metadata for the image and using link information to retrieve the content.

Metadata for the content may be analyzed at step 1560 by control circuitry 1004 for the media guidance application to determine whether the content is associated with an entity. For example, the media guidance application may determine whether content is connected to a group, organization, team or another entity. The entity information may be useful to obtain a message to include with the content that is relevant to the entity. For example, if the media guidance application has retrieved an image including a New England Patriots logo, matching images may be associated with content for football games, player news, team articles, team merchandise, NFL statistics, or other content. The media guidance application may detect that the content is associated with an entity—e.g., the New England Patriots, football, the NFL, or another entity. If the media guidance application determines that the content is associated with an entity at step 1560, the media guidance application may search for a message in the user's social network that is associated with the entity at step 1565.

At step 1565, control circuitry 1004 for the media guidance application may select a message based on the entity. The message may be selected by the media guidance application from a user's social network history, such as record 300 (FIG. 3), or another user history or user profile.

If however, the media guidance application does not detect an entity associated with the content, the media guidance application may continue process 1500 at step 1570 to determine whether the content is associated with a time. For example, the media guidance application may find an events schedule for a matching image. For example, an image may be for a celebrity who may have a concert schedule, or be part of a movie having a particular release schedule and showtimes at a theater, or be an NFL logo for a team having a certain game schedule, etc. The event information and associated time can be used as a basis for finding a suitable message from a user's social network to include in the augmented reality environment. In some scenarios, step 1570 may also be performed if the media guidance application cannot find a suitable message based on the entity at step 1565.

If a time-based element is determined at step 1570, the media guidance application may select a message from a user's social network record, e.g., record 300 (FIG. 3) to find a message related to the time.

If no time-based element is found at step 1570 by the media guidance application, the control circuitry 1004 for the media guidance application may, at step 1580, not select a message using a time element. In such a scenario, the media guidance application may select a message from a social network using another basis, such as keyword matching based on metadata for the matching image, or some combination of techniques described herein.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 15.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating for display an augmented reality view on a display device associated with a user account;
detecting an object in the augmented reality view;
identifying social network content related to metadata of the detected object that was posted in a social network in connection with the user account; and
modifying the display of the augmented reality view to include the identified social network content.

2. The method of claim 1, wherein the social network content posted in the social network in connection with the user account corresponds with a posting in a social network by a device associated with the user account.

3. The method of claim 1, wherein the social network content posted in the social network in connection with the user account corresponds with a posting in a feed of a social network by a contact associated with the user account.

4. The method of claim 1, wherein the identified social network content includes at least one of a message related to the object obtained from the social network content, a video clip related to the object, a television program related to the object, an image related to the object, a book related to the object, other media content related to the object, information about an event related to the object, or information about a participant related to the object.

5. The method of claim 1, wherein the modifying includes overlaying the identified social network content onto a portion of the augmented reality view, and/or combining the identified social network content with a portion of the augmented reality view.

6. The method of claim 1, comprising taking a photograph or screenshot of the augmented reality view, and/or using camera circuitry to store pixels representing a picture or video image.

7. The method of claim 1, comprising determining an area of focus in the augmented reality view and performing the generating, detecting, identifying, and modifying with the object located in the area of focus.

8. The method of claim 1, comprising determining a location for placement of the identified social network content, and placing the identified social network content based on the location.

9. The method of claim 1, comprising determining an event related to the object; and determining a particular time or a particular order for the modifying based on the determined event.

10. The method of claim 1, comprising, after the modifying, generating for display a selectable option to perform at least one of capture the modified augmented reality view including the identified social network content, consume the identified social network content, or access content related to the object.

11. A system comprising circuitry configured to:
generate for display an augmented reality view on a display device associated with a user account;
detect an object in the augmented reality view;
identify social network content related to metadata of the detected object that was posted in a social network in connection with the user account; and
modify the display of the augmented reality view to include the identified social network content.

12. The system of claim 11, wherein the social network content posted in the social network in connection with the user account corresponds with a posting in a social network by a device associated with the user account.

13. The system of claim 11, wherein the social network content posted in the social network in connection with the user account corresponds with a posting in a feed of a social network by a contact associated with the user account.

14. The system of claim 11, wherein the identified social network content includes at least one of a message related to the object obtained from the social network content, a video clip related to the object, a television program related to the object, an image related to the object, a book related to the object, other media content related to the object, information about an event related to the object, or information about a participant related to the object.

15. The system of claim 11, wherein the modifying includes overlaying the identified social network content onto a portion of the augmented reality view, and/or combining the identified social network content with a portion of the augmented reality view.

16. The system of claim 11, wherein the circuitry is configured to take a photograph or screenshot of the augmented reality view, and/or use camera circuitry to store pixels representing a picture or video image.

17. The system of claim 11, wherein the circuitry is configured to determine an area of focus in the augmented reality view and performing the generating, detecting, identifying, and modifying with the object located in the area of focus.

18. The system of claim 11, wherein the circuitry is configured to determine a location for placement of the identified social network content, and placing the identified social network content based on the location.

19. The system of claim 11, wherein the circuitry is configured to determine an event related to the object; and determine a particular time or a particular order for the modifying based on the determined event.

20. The system of claim 11, wherein the circuitry is configured to, after the modifying, generate for display a selectable option to perform at least one of capture the modified augmented reality view including the identified social network content, consume the identified social network content, or access content related to the object.

* * * * *